Patented Aug. 9, 1949

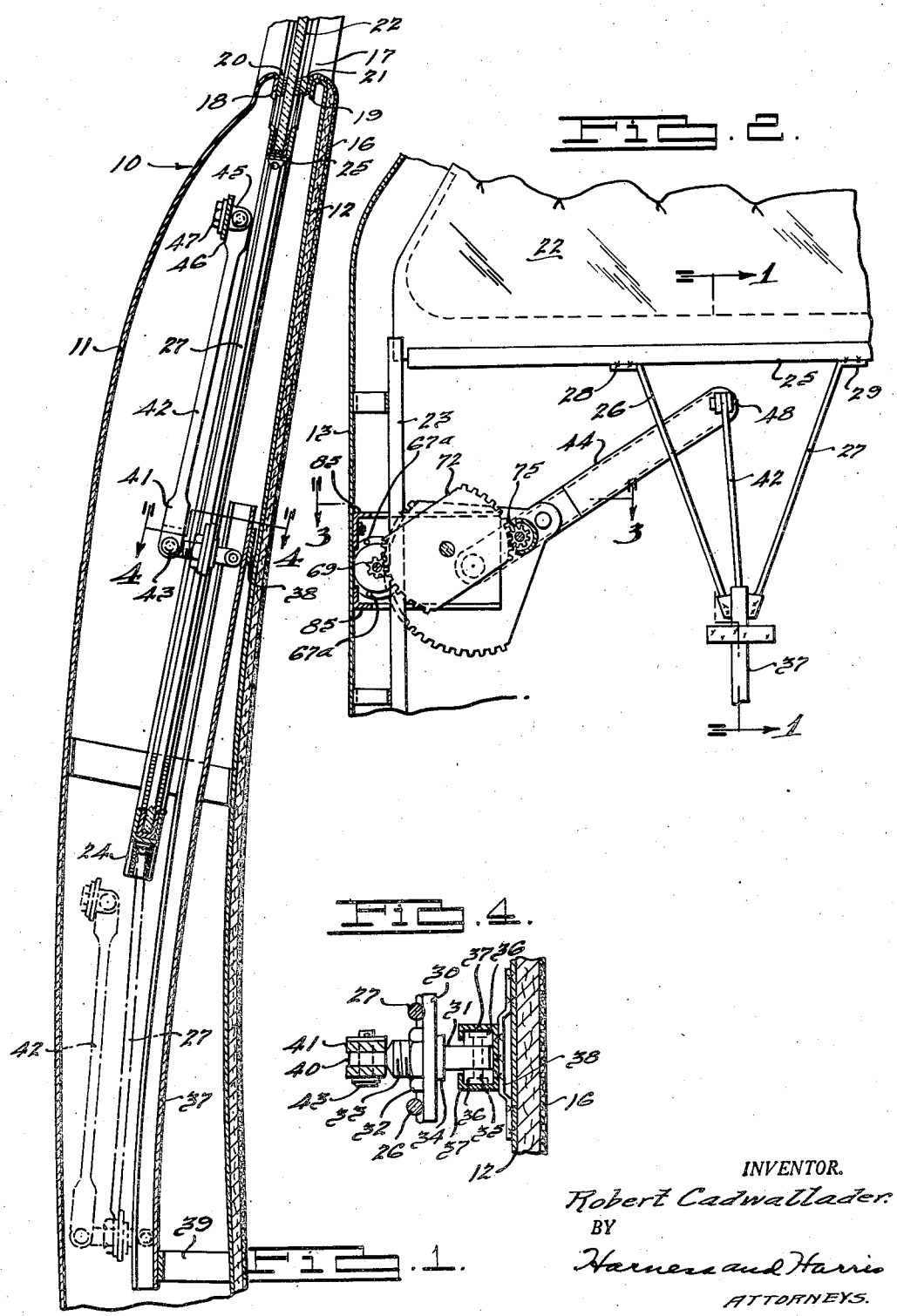

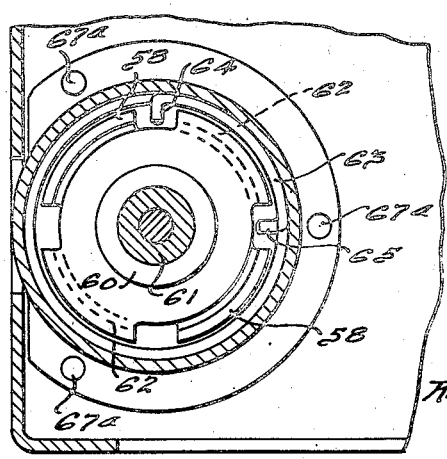

2,478,523

UNITED STATES PATENT OFFICE 2,478,523

APPARATUS FOR REGULATING WINDOWS

Robert Cadwallader, Detroit, Mich., assignor to Chrysler Corporation, Highland Park, Mich., a corporation of Delaware Application November 23, 1944, Serial No. 564,772

4 Claims. (Cl. 268—126)

This application relates to the control of an adjustable closure member for an opening in a wall structure. More specifically it relates to the adjustment of a window mounted in an automobile door.

A window in the door of an automotive vehicle is normally raised and lowered through a control member such as a crank at the inner side of the door, connected with the window by means of a mechanism that will conveniently transmit the angular movement of the crank as movement of reciprocation to the window. With the control member at the inner side of the door it is quite convenient to position the aforesaid motion-transmitting mechanism at the inner side of the path through the path of the door followed by the window.

In modern automobiles the trend is toward increasing the interior width without increasing the outer width. I have discovered that the interior width or the distance between doors at opposite sides of the automobile may be increased by placing at least a portion of the aforementioned motion-transmitting mechanism outward of the window path and thereby making possible a reduction in thickness of the portions of the doors inward of the window. This is possible, because in modern automobiles the doors are so shaped that there is normally a considerable thickness of the doors outward of the window path.

An object of the present invention is to provide an improved arrangement for adjusting a closure member with respect to an opening in a wall structure. This arrangement may find advantageous use in the opening and closing of a window in a vehicle door.

A further object relates to improvements in a door construction for a vehicle. The improvements are of such a nature as to make possible the increase in inside width of the vehicle or the distance between opposed vehicle doors.

Other objects will appear from the disclosure.

In the drawings:

Fig. 1 is a vertical section through a door, taken on the line 1—1 of Fig. 2;

Fig. 2 is a vertical section taken on line 2—2 of Fig. 3;

Fig. 3 is a horizontal section taken on line 3—3 of Fig. 2;

Fig. 4 is a horizontal section taken on line 4—4 of Fig. 1;

Fig. 5 is a sectional view taken on the line 5—5 of Fig. 3; and

Fig. 6 is a sectional view taken on the line 6—6 of Fig. 5.

The reference character 10 designates a door that may be the side door of an automotive vehicle. The door 10 comprises an outer side 11, and an inner side 12, formed of sheet metal. The door 10 opens at the side toward the left as shown in Figs. 2 and 3. The left end of the inner side 12 has, as shown in Fig. 3, an outwardly extending flange 13, the very end of which is provided with a flange 14 extending generally parallel to the body of the inner side 12. The flange 14 is gripped between the body of the outer side 11 and a flange 15 formed on the outer side 11. A non-metallic covering 16 is attached to the inner side 12. As seen in Fig. 2, the left end of the door 10 is formed so as to slope upwardly toward the right, thereby providing the door at its upper portion with a width decreasing progressively in an upward direction. The inner and outer sides 11 and 12 are so shaped as to provide an opening 17 at the upper part of the door, and the portions of the sides 11 and 12 at the opening are provided, respectively, with closely spaced flanges 18 and 19, provided with sealing strips 20 and 21, receiving a window 22. The window 22 is adapted to be moved up and down in the door so as to close and to open the opening 17 and in so doing it moves in channeled tracks 23 and 24, the track 23 as shown in Figs. 2 and 3 engaging the left end of the window 22, and the track 24 as shown in Fig. 1 engaging the right end of the window. A channel 25 grips the lower edge of the window 22, and two dependent and converging members or arms 26 and 27 are attached to the channel 25 by flanged feet 28 and 29 secured to the channel 25 as by soldering or welding. The lower juxtaposed ends of the arms 26 and 27 are joined as by soldering or welding to a small plate 30, as shown in Figs. 2 and 4. A bolt 31 passes through the plate 30 and is secured thereto by a nut 32 engaging a threaded portion 33 of the bolt 31. The plate 30 is gripped between the nut 32 and a shoulder 34 formed on the bolt 31. As viewed in Fig. 4, the right end of the bolt 31 has mounted thereon by means of a rivet 35 a pair of rollers 36, slidable within an elongated channel 37. The upper end of the channel 37 is attached adjacent the inner side 12 of the door by means of a shallow bracket 38, attached to the channel 37 and the inner side 12 as by soldering or welding. The lower end of the channel 37 is attached to the inner side 12 of the door 10 in somewhat spaced relation by a relatively deep bracket 39. The bracket 39 is secured to the channel 37 and the inner side 12 as by soldering or welding.

The left end of the bolt 31 has a reduced portion 40, which is embraced by a clevis portion 41 on the lower end of a link 42. The link 42 is pivotally connected to the reduced portion 40 by a pin 43. The upper end of the link 42 is connected to a channel 44 by means of a clevis 45 pivotally secured to the channel 44 by a bolt 47 and by means of a pin 48 pivotally tying the link 42 and the clevis 45. The channel is secured to an arcuate dentate member 49 by means of a rivet 50. The channel 44 and dentate member 49 are also secured by a mounting member 50, which pivotally carries the channel and member in a flanged opening 51 in a U-shaped member 52 and is riveted to all these parts. The flanged opening 51 is in a leg 53 of the U-shaped member 52, which leg has a pressed out portion 54, to which a pin 55 is secured. The pin rotatably carries a pinion 56 meshing with the teeth of the dentate member 49, there being an opening in the pressed out portion 54, through which the dentate member 49 projects. A member 57 is secured to the pinion 56, being attached thereto by a slightly dished central portion. The member 57 is generally circular in shape but has two diametrically opposed flanges 58 projecting at right angles from the body of the member 57. A generally similar member 59 is secured to an enlarged end 60 of a shaft 61 by a dished central portion. The pin 55 is journalled in an opening in the end 60 of the shaft 61. The member 59 is generally circular and has diametrically opposed flanges 62 projecting between the flanges 58 of the member 57. A coil spring 63 surrounds the flanges 58 and 62 and has a bent end 64 between one flange 58 and one flange 62 and another bent end 65 between the other flange 58 and the one flange 62. A cupped member 66 embraces the spring 63 and has an outer flange 67 by which it is riveted as indicated at 67a to the U-shaped member 52, and a central flanged opening 68, on which the shaft 61 is journalled. The right end of the shaft 61 carries a pinion 69 and a reduced portion 70, journalled in a bearing 71, secured in an opening in the U-shaped member 52. The pinion 69 meshes with a gear 72 rotatably mounted by a rivet 73 in a dished portion 74 of the U-shaped member 52. The gear 72 meshes with a pinion 75 secured to or formed integral with a short shaft 76 journalled at one end in a bearing 77 mounted in a retainer 78 secured to the U-shaped member 52, and at an intermediate portion in a flanged opening in the U-shaped member 52. The other end of the shaft 76 has secured to it a manually operable crank handle 79 at the inner side of the door. A spacer 80 is between the handle 79 and a covering or lining 81 for the inner side of the door. The U-shaped member 52 is secured to the inner sheet 12 of the door by screws 82 and nuts 83 welded or soldered to the U-shaped member 52, two sets of screws and nuts being shown in Fig. 3 near the lower side of the U-shaped member 52 and there being two more adjacent the upper side, not shown. As seen in Fig. 2 the base of the U-shaped member 52 is similarly secured to the flange 13. Ribs 84, pressed inwardly in the U-shaped member 52 cooperate with the rivet 73 and the retainer 78 to hold the gear 72 in a position in which it remains in mesh with the pinions 69 and 72. The U-shaped member 52 has upper and lower flanges 85 for stiffening.

Raising and lowering of the window 22 is accomplished by rotation of the crank handle 79. The rotation causes the pinion 75, the gear 72, the pinion 69, and the shaft 61 to rotate. Accordingly, the member 59, secured to the shaft 61 rotates, causing one flange 62 to contact one bent end of the spring 63. Suppose, for example, that the rotation of the crank handle is downward as viewed in Fig. 3. Then the rotation of the member 59 is clockwise, causing the one flange 62 to contact the bent end 65 of the spring 63. The spring 63, as shown, fits snugly in the cupped member 66, and the rotation of the spring transmitted to it through the flange 62 and the bent end 65 is such as to wind it up, thereby tending to reduce its diameter and to draw it out of a snug fit with the cupped member 66. The flange 62 moves the bent end 65 against one flange 58, causing it and the member 57 to rotate with the flange 62 and the member 59. Thus the clockwise rotation of the pinion 69 causes clockwise rotation of the pinion 56, which brings about counterclockwise rotation of the dentate member 49 and raising of the outer end of the channel 46. Raising of the outer end of the channel 46 causes through the instrumentality of the link 42, the bolt 31, and the arms 26 and 27, raising of the window 22. Lowering of the window 22 is effected through counterclockwise rotation of the crank handle 79. In this event the one flange 62 moves counterclockwise against the bent end 64 of the coil spring 63, causing it to move against one flange 58. This results in counterclockwise rotation of the flange 58 and its member 57, which in turn results in lowering of the window 22. If forces were applied directly to the window tending to raise or lower it, such movement would be prevented by the coil spring 63. In this event the one flange 58 would move against the bent end 65, or the other flange 58 would move against the bent end 64, and the spring 63 would tend to unwind and so become tightly lodged in the cupped member 66. The bent ends 64 and 65 would prevent movement of the member 57. Thus the pinion 56, the dentate member 49, and the channel 44 could not move, and consequently, the window 22 could not move.

It will be apparent from the foregoing description that there has been provided an apparatus by which control of the window 22 is exerted at the inner side of the door 10 by the crank handle 79, and yet the crank handle is associated with the window by means that is directly connected to the window by parts located at the outer side of the window and makes a path along the inner side of the path of the window, around the edge thereof, and along the outer side of the path of the window. The means in this path includes the gear 72, the pinion 69, the shaft 61, the pinion 56, the dentate member 49, the channel 44, and the link 42. It will be observed from Fig. 1 that this arrangement is advantageous, for it permits the dentate member 49, the channel 44, and the link 42 to be in the ample space between the path of the glass 22 and the curved outer sheet 11 of the door 10. Thus the inner sheet 12 can be nearer the path of the window 22, and the interior width of the vehicle between the inner sheet 12 and the corresponding inner sheet on the opposite door can be greater for a given exterior width of the vehicle between the outer sheet 11 and the corresponding outer sheet of the opposite door.

I claim:

1. The combination with a vehicle door having an opening and a window for the opening movable within and along the door in a predetermined path to and from closed position with respect to the opening, of means for moving the window to and from closed position, said means comprising a rotatable crank mounted in the inner side of the door and extending inwardly therefrom for manual operation, a first pinion mounted in the door coaxially with and for rotation with the crank inward of the path of the window, an idler gear meshing with the first pinion and mounted in the door inward of the path of the window, a second pinion positioned beyond one vertical edge of the path inward of the path and meshing with the idler gear, a third pinion associated with the second pinion for coaxial rotation therewith and positioned beyond the said one vertical edge of the path outward of the path, a dentate member mounted for rotation in the door outward of the path and meshing with the third pinion, a first link means connected with a point of the dentate member of its axis of rotation and positioned outward of the path of the window, and a second link means connecting the first link means and the lower edge of the window.

2. The combination with a vehicle door having an opening and a window for the opening movable within and along the door in a predetermined path to and from closed position with respect to the opening, of means for moving the window to and from closed position, said means comprising a rotatable crank mounted in the inner side of the door and extending inwardly therefrom for manual operation, a first pinion mounted in the door coaxially with and for rotation with the crank inward of the path of the window, an idler gear meshing with the first pinion and mounted in the door inward of the path of the window, a second pinion positioned beyond one vertical edge of the path inward of the path and meshing with the idler gear, a third pinion associated with the second pinion for coaxial rotation therewith and positioned beyond the said one vertical edge of the path outward of the path, a dentate member mounted for rotation in the door outward of the path and meshing with the third pinion, a link connected at one end with a point of the dentate member spaced from its axis of rotation and positioned outward of the path of the window, a pair of arms connected at one end to spaced regions of the lower edge of the window and at their other end to the other end of the link, and means mounted in the door for forming a vertical track for the said other ends of the links and the arms outward of the path of the window.

3. The combination with a vehicle door having an opening and a window for the opening movable within and along the door in a predetermined path to and from closed position with respect to the opening, of means for moving the window to and from closed position, said means comprising a rotatable crank mounted in the inner side of the door and extending inwardly therefrom for manual operation, a rotatable element mounted in the door outward of the path of the window, means drivingly connecting the rotatable crank and the rotatable element by extending from the crank transversely and inwardly of the path of the window, around one vertical edge of the path, and transversely and outwardly of the path to the rotatable element, a link connected at one end with the rotatable element, a pair of arms connected at one end with spaced regions of the lower edge of the window and at their other end with the other end of the link, and means mounted in the door for forming a vertical track for the said other ends of the link and the arms outward of the path of the window.

4. The combination specified in claim 1 and further including a shaft connecting the second and third pinions and braking means associated with the shaft adjacent the third pinion for preventing the window from dropping by its own weight.

ROBERT CADWALLADER.

REFERENCES CITED

The following references are of record in the file of this patent:

UNITED STATES PATENTS

| Number | Name | Date |
|---|---|---|
| 1,550,559 | Miller | Aug. 18, 1925 |
| 1,844,427 | Kirchoff | Feb. 9, 1932 |
| 1,850,864 | Campbell | Mar. 22, 1932 |
| 1,870,400 | Butterfass | Aug. 9, 1932 |
| 1,937,662 | Nicholson | Dec. 5, 1933 |
| 1,986,940 | Morrison | Jan. 8, 1935 |
| 2,016,645 | Maddox | Oct. 8, 1935 |
| 2,366,092 | Floraday | Dec. 26, 1944 |